US006986135B2

(12) United States Patent
Leathers et al.

(10) Patent No.: US 6,986,135 B2
(45) Date of Patent: Jan. 10, 2006

(54) DEPLOYMENT MANAGER FOR ORGANIZING AND DEPLOYING AN APPLICATION IN A DISTRIBUTED COMPUTING ENVIRONMENT

(75) Inventors: Burton Leathers, Kanata (CA); Christian Legault, Nepean (CA)

(73) Assignee: Cognos Incorporated, Ottawa (CA)

( * ) Notice: Subject to any disclaimer, the term of this patent is extended or adjusted under 35 U.S.C. 154(b) by 619 days.

(21) Appl. No.: 09/948,172

(22) Filed: Sep. 6, 2001

(65) Prior Publication Data

US 2003/0182656 A1 Sep. 25, 2003

(51) Int. Cl.
   - G06F 9/445 (2006.01)
   - G06F 9/44 (2006.01)
   - G06F 15/173 (2006.01)
   - G06F 15/00 (2006.01)

(52) U.S. Cl. .................. 717/177; 717/172; 709/223; 715/513

(58) Field of Classification Search ......... 717/168–178, 717/100; 718/100–102; 709/200–203, 220–223; 715/513
   See application file for complete search history.

(56) References Cited

U.S. PATENT DOCUMENTS

| | | | | |
|---|---|---|---|---|
| 5,742,829 A | * | 4/1998 | Davis et al. ................. | 717/178 |
| 6,223,345 B1 | | 4/2001 | Jones et al. ................. | 717/100 |
| 6,247,020 B1 | * | 6/2001 | Minard ..................... | 707/104.1 |
| 6,523,166 B1 | * | 2/2003 | Mishra et al. .............. | 717/174 |
| 6,732,168 B1 | * | 5/2004 | Bearden et al. ............. | 709/223 |
| 2002/0078103 A1 | * | 6/2002 | Gorman et al. ............. | 707/530 |
| 2002/0138617 A1 | * | 9/2002 | Christfort et al. ........... | 709/225 |

* cited by examiner

*Primary Examiner*—Antony Nguyen-Ba
(74) *Attorney, Agent, or Firm*—Shumaker & Sieffert, P.A.

(57) ABSTRACT

An efficient and reliable method and system for organizing an application in a source environment and deploying the application into a target environment is disclosed. The method comprises steps of (a) defining an application for creating an application definition containing a list of application components, (b) defining a package according to the application definition for creating a package definition including deployment policies, (c) creating an application package according to the package definition, which contains all the information required to install the application, and (d) installing the application package into the target environment. Preferably, the method may further include a step of defining an environment for creating a configuration definition containing information on the source and target environments. The method may further include steps of transferring the application package from the source environment to the target environment before the application package installing step (d), and validating the installation prior to completion.

29 Claims, 3 Drawing Sheets

DEPLOYMENT MANAGER FOR ORGANIZING AND DEPLOYING AN APPLICATION IN A DISTRIBUTED COMPUTING ENVIRONMENT

TECHNICAL FIELD

This invention relates generally to deployment of an application and its constituent information in a distributed computing environment and, more particularly, to an efficient method for organizing an application in the place in which it is created (the source environment) and deploying it into the place or places in which it is to be used (the target environment(s)).

BACKGROUND OF THE INVENTION

Today, organizations worldwide are looking for more effective, less costly ways to deploy, manage, and update an ever-increasing collection of software, data, and Web content to service the information-handling needs of their employees, business partners, and customers.

An application is a collection of information and data modelled, and organized and presented in a way to solve a business need. In many cases, however, the source environment is different from the target environment. The application must, therefore, be deployed. There is also a need for the application deployed to be updated on a scheduled or as-required basis.

Deployment may be thought of as the act of moving a customer application from one environment to another. For example, an application having been developed, it must be taken into a new environment, such as user communities. In order to do this, all the pieces that make up the application should be physically moved to and integrated into the new environment. In other words, it is a mechanism for deploying an application.

In the simplest possible terms, deploying an application is the movement of the "content" of the application from one environment (the source) to another (the target). Practically, moving the content of the application is only a small part of the act of deployment. There are other activities which precede and follow the movement of the content which are important parts of the deployment process.

SUMMARY OF THE INVENTION

A need has been identified for an efficient and reliable method and system for organizing an application in a source environment and deploying it into a target environment or multiple target environments. There is also a need for an efficient and reliable method and system for updating an application which has been deployed in a target environment.

Significant aspects of the activities which precede and follow the actual movement of content pertain to those ways in which the content contains explicit or implicit dependencies upon the environment within which it resides. Prior to the movement of content, it is necessary to identify all instances within the content in which there is an environmental dependency. Subsequent to the movement of content, it is necessary to amend the content so as to resolve all such dependencies in the new environment. There are many such forms of dependencies so a further goal of the invention is to render all such dependencies in a canonical form and to provide canonical forms of processing for them.

In accordance with the present invention, there are provided an efficient and reliable method and system for organizing an application in a source environment and deploying the application into a target environment. The method comprises the steps of (a) defining an application for creating an application definition, (b) defining a package according to the application definition for creating a package definition, (c) creating an application package according to the package definition, and (d) installing the application package into the target environment. Preferably, the method may further include a step of defining an environment for creating a configuration definition before the application defining step (a). Also, the method may further include a step of transferring the application package from a source environment to a target environment before the application package installing step (d).

In the environment defining step, the configuration definition includes a source definition and a target definition containing information on a network location of a source system and a target system respectively. Preferably, the configuration definition may include a plurality of target definitions containing information on network locations of plural target systems, and a plurality of source definitions containing information on network locations of plural source systems. In this step, an existing configuration definition may be changed or modified. Preferably, the configuration definition may be a structured document.

The application defining step (a) comprises the steps of determining application components which are available from a source environment and creating an application definition. The application definition comprises a list of application components, in which each application component may comprise a list of application entities. Each application entity has its own unique identifier. Preferably, the application definition may be a structured document, which may include a list of word processor documents, files, folders, and HTML pages, etc.

The package defining step (b) comprises the steps of creating a packlet definition which is associated with each application entity of the application definition, and creating the package definition. The package definition comprises the application definition, the packlet definitions, and a deployment policy. The packlet definition includes an application entity and a packing policy associated with it. The deployment policy includes at least one of a global policy, a packing policy, a behavioural policy, and a mapping policy. Preferably, the package definition may be a structured document which can be updated and used repeatedly.

The application package creating step (c) comprises steps of creating a packlet associated with each application entity in accordance with the package definition, singling out a fix-up which is to be resolved on the target environment, and creating an application package containing all the information required to install an application. During this step, a deployment policy may be generated, which includes a dependency policy, a mapping policy, and an installation policy. Also, a graph may be generated. Therefore, the application package comprises the package definition, the packlet, a list of packlets, and the fix-up, and may further include the deployment policy and the graph. Preferably, the packlet may be portable or platform independent and be a file or a tree of files which are to be stored in a known directory. The application package may be a structured document. Preferably, the application package may be updated from an existing application package. More preferably, the application package may be generated by an unattended operation.

In the step of transferring the application package, a file containing a list of all the files of application package may be generated and transferred together with the application package. Preferably, the application package may be stored on a shared directory on a network for avoiding a physical movement of it to a target environment.

The application package installing step (d) comprises steps of specifying information to be required for installing, and placing the application package content into the target environment. The information specifying step, in turn, comprises steps of selecting application components to be installed in the target environment from the list of application entities of the application package, mapping the entities generated during the application package creating step, and defining conflict resolution policies and fix-up policies to resolve content conflicts which may arise during the application package placing step. The entity mapping step includes a packlet mapping, target mapping, and custom mapping. In the step of placing the application package content, the application package is unpacked and placed in inverse dependency order into the target environment. Preferably, the application package installing step (d) may further include a step of validating installation for identifying a conflict situation for which no policies have been defined in the previous processes and defining a policy for the conflict situation. This validating step may be iterated until an acceptable result is obtained.

Most preferably, the application package may be installed into plural target environments at a time.

The system provides means for carrying out the steps outlined above in a distributed computing environment comprising one or more interconnected computers, with a user interface, and one or more content providers.

BRIEF DESCRIPTION OF THE DRAWINGS

These and other features, aspects, and advantages of the present invention will become better understood with regard to the following description, appended claims, and accompanying drawings, in which:

DETAILED DESCRIPTION OF THE INVENTION

Glossary

To assist the reader, the following glossary of terms is provided, which will be used in this description and in the appended claims.

Application: A collection of information and data modelled, organized and presented in such a way as to solve a business need.

Application Component: An abstract software entity which is a part of one or more applications. The smallest subset of an application which is capable of autonomous usage and, therefore, of being independently included in, or excluded from, an application package.

Application Content: Application content defines the objects within an application.

Application Entity: The smallest, independently identifiable piece of content which is used within an application and is identified by its DM-ID.

Application Package: A packlet, or set of packlets which, along with any other necessary files, contain all the necessary information to install the application into a target environment. The data stored in an application package is portable, or platform independent.

DM-ID: A DM-ID provides a simple and extensible means for identifying a resource via a representation of their network "location." The content type and location of its content server typically identify a resource.

Content Provider: The code within an application component which is capable of processing a particular type of application content, e.g. an HTML page, so as to provide data import/export capabilities and environmental dependency identification and resolution in response to commands from the deployment engine.

Content Server: A server which implements a content provider so as to provide remote access to a specific content type.

Dependencies: A configurable or direct relationship between two application entities within an application. Also, used to express a reliance on another component or product.

Deployment Policy: A deployment policy consisting of a piece of information that dictates the behaviour of a content server when packaging or installing an application component.

Environment (Source or Target): The source environment indicates the system, or set of systems, from which the application is to be extracted or packed. The target environment indicates the system, or set of systems, to which the application will be deployed or installed.

Package Definition File: The package definition describes the application components that are part of an application package, how those application components are partitioned. This information will be used as input to the packing process.

Packlet: A collection of various items necessary to build an application component. The data stored in a packlet may be portable or platform independent.

Figure 1:
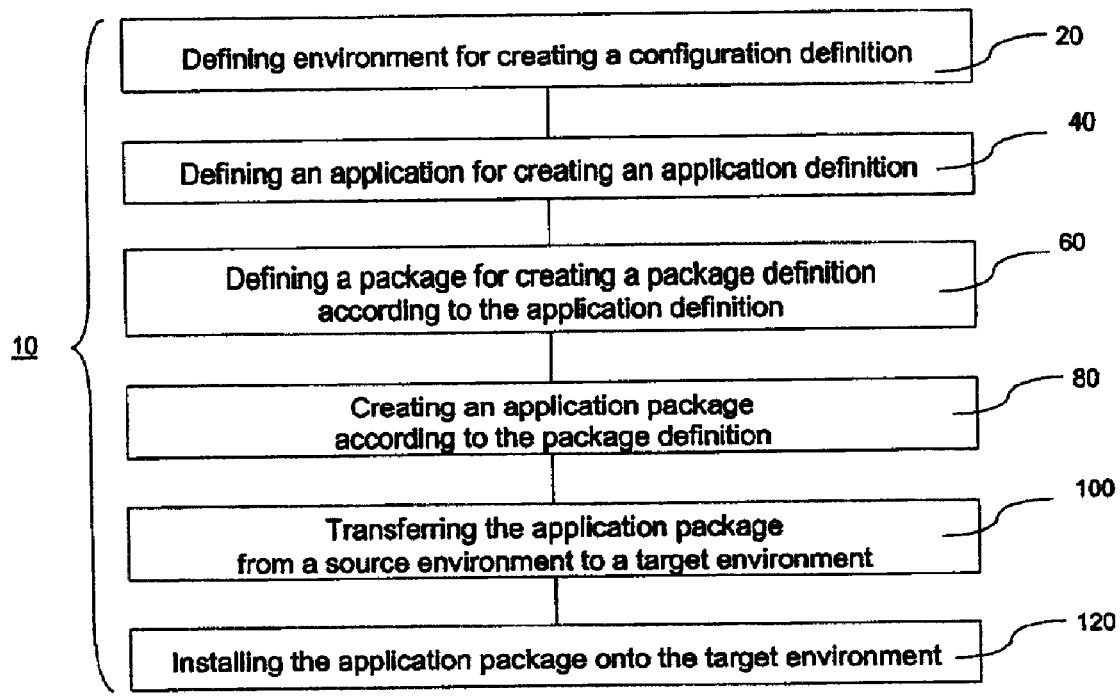
FIG. 1 is a general sequence of a method of creating and deploying an application according to the present invention.

In FIG. 1, there is shown a general process of a method for creating and deploying an application in accordance with the present invention. As is shown in the figure, the method of the invention comprises the steps of defining environment for creating a configuration definition 20, defining an application for creating an application definition 40, defining a package according to the application definition for creating a package definition 60, creating an application package according to the package definition 80, transferring the application package from a source environment to a target environment 100, and installing the application package into the target environment 120.

Figure 2:
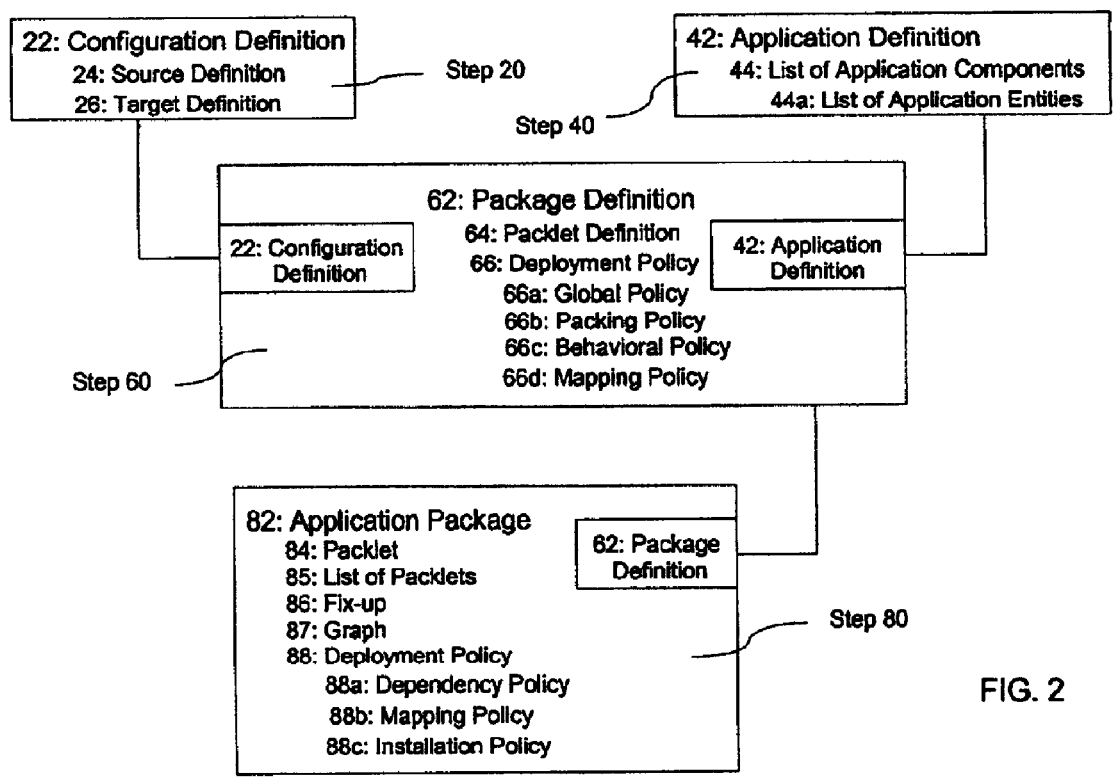
FIG. 2 is a diagram showing various entities produced by the sequential steps of the method.

In FIG. 2, there are illustrated various entities produced by virtue of each step of the invention, ranging from a configuration definition 22 associated with the step 20 to an application package 82 with the step 80. These product entities associated with each step are a file or files which may preferably be a structured document or documents.

Details on each step and its associated product entities will be explained below in sequence, referring to FIGS. 1 and 2.

1. Defining an Environment—Step 20

In step 20, a computing environment is defined, which comprises a source environment and a target environment. Preferably, any existing environment may be changed in this step appropriately for subsequent sequences. The environment defined or changed is hereinafter referred to as a "configuration definition."

As is shown in FIG. 2, the configuration definition 22 includes a source definition 24 and a target definition 26, which may contain information on a network location of a source system and a target system respectively. Preferably, the configuration definition may include several source definitions or target definitions. Multiple target definitions may be beneficial in order to define a target as a separate entity to allow an application to be deployed to multiple sites as one process.

A Preferred Embodiment for the Environment Defining Step

Figure 3:
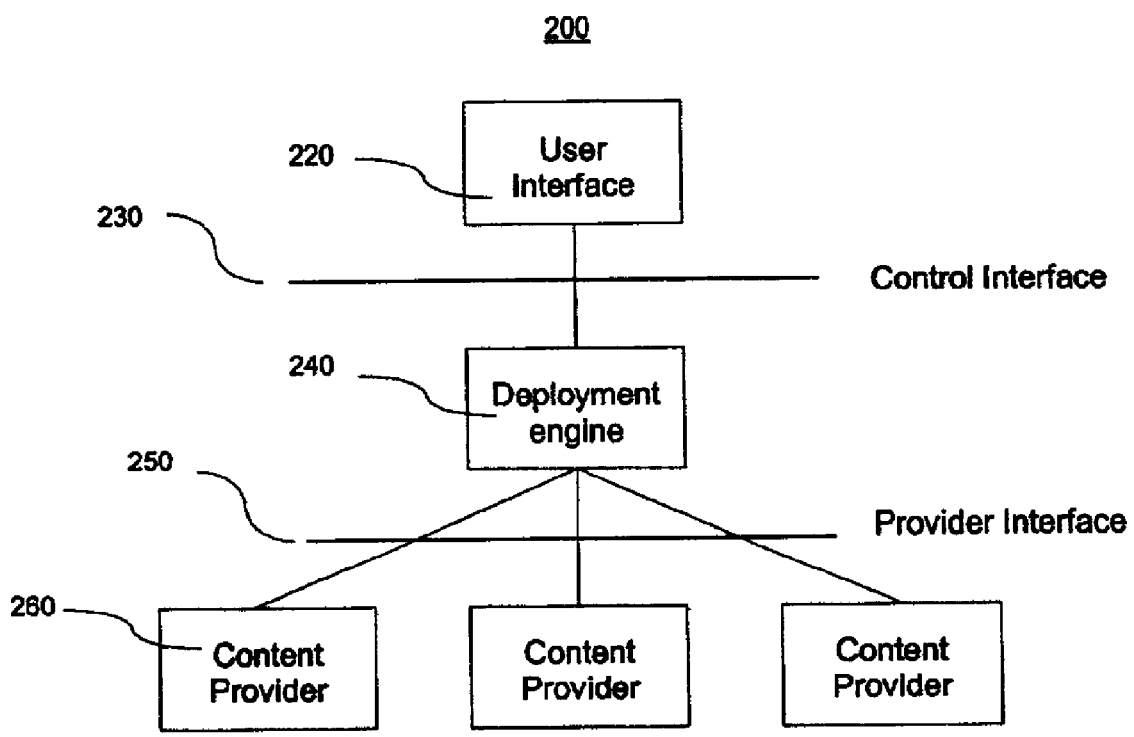
FIG. 3 is a general architecture of a deployment managing system which can be embodied by and carry out the present invention.

Referring to FIG. 3, there is shown a general architecture of a preferred deployment managing system in accordance with the present invention. For convenience of description, the deployment managing system is hereinafter referred to as a "deployment manager," which is generally denoted as a reference numeral 200.

As shown in FIG. 3, the deployment manager 200 comprises a user interface 220, a control interface 230, a deployment engine 240, a content provider interface 250, and at least one content provider 260, which represent a three-tier architecture. There are two advantages to the three tier architecture. Firstly, it serves to isolate the essential logic of the facility from the platform sensitive elements of the user interface 220. Secondly, by separating the deployment engine 240 from the content providers 260, it becomes possible to add new content providers without changing the deployment engine 240.

A description for each step will be followed by its preferred embodiment including an example code snippet corresponding to the respective step, which will be described with reference to activities of all the components of the deployment manager 200, especially those of the deployment engine 240. The preferred embodiment of the invention uses a simple request-response form of interaction between the tiers which comprise the deployment manager. Preferably, both the requests and responses are expressed in a structured definition language. A structured definition language, such as SGML, or XML, is a notation that provides the means to formalize document structure in a Document Type Definition (DTD). Such a DTD specifies that a document is an element that is comprised of other elements. It specifies the elements that may occur in a document and the order in which they may occur, and allows document markup to be validated, using an appropriate parser, according to the governing document type definition. A brief summary of the DTD showing the requests (commands) and entities, which are used in the preferred embodiment of each step, and in the example code snippets, is exhibited in the Appendix: Document Type Description, which is part of this specification.

As is shown in the following code snippet of the embodiment, defining an environment is a process of locating content servers that provide deployment functionality. In the deployment manager 200, it may be the responsibility of the end-user to enter the content servers within an environment. The deployment manager 200 may use the 'Ping' request to validate that the entered servers are indeed capable of providing deployment services. In the presented code, the 'Ping' request is used to contact a server in order to determine if it is available and if it is able to respond to the deployment manager 200 requests, as is explained in the Appendix. This command is used by the deployment engine 240 to validate the servers that are being added to an environment.

Client Request (to Deployment Engine)

```
<Request version="1.0" locale="en-ca" synchronous="true">
    <Command>
        <Ping>
            <ContentServer cdmID = "dm://PRODUCT1/prod1:20" />
        </Ping>
    </Command>
</Request>
```

Deployment Engine Response

```
<Response>
    <Status successful="true"/>
    <Result />
</Response>
```

Content Provider Response

```
<Response>
    <Status successful="true"/>
    <Result />
</Response>
```

The subsequent steps of the invention depend greatly upon knowledge of the machine and software environments within which the method of the invention is carried out. The configuration definition is concerned with the definition of the environment within which the method operates. For example, the environment may contain information on the network location of the available servers. Once a content server is added to the environment, deployment operations can be performed on the server. When adding a content server, the user may select a content type and specify the network location of the content server. The available content types are based on the content providers that are available to the deployment engine.

2. Defining an Application—Step 40

In the step 40, an application to be deployed to a target environment is defined to create an application definition. The application defining step 40, in general, comprises steps of determining application components available from a source environment and creating an application definition.

As is depicted in FIG. 2, the application definition 42 comprises a list of application components 44, which are available in the source environment defined by the configuration definition 22 in the step 20 or any existing environment definition. Each application component 44 includes at least one application entity, i.e., the application component comprises a list of application entities 44a. The difference between an "application component" and an "application entity" will be readily understandable to those skilled in the art by referring to the glossary of terms provided at the beginning of the description.

Preferably, the application definition 42 may be written to a file such as a structured document. More preferably, the application definition 42 may include other documents such as a list of word documents, files, folders, HTML pages, other structured documents.

A way in which an application definition is created will become more apparent to those skilled in the art by referring to the following description and example code snippet.

A preferred Embodiment for the Application Defining Step

Similar to the previous step 20, this embodiment will be described in conjunction with the activities and functions of the deployment manager 200 shown in FIG. 3. A more concrete understanding of the example code snippet will be provided by reference to the Appendix: Document Type Description.

In this embodiment, the application component may be as little as a single file but in most instances is a complex, structured collection of "application entities," which is identified using a DM-ID (as described below). The content providers 260 are responsible for defining the form of the DM-IDs.

DM-ID (Deployment Manager IDentifier) is the means whereby the deployment manager refers to all application entities. Further, for uniformity of operation, every server, host, content type and even the deployment manager itself have a unique DM-ID. This is especially important for the "deployment policies" which are described hereafter.

The format of a DM-ID is "dm://ContentProviderInfo/ContentServerInfo/ApplicationComponentInfo," wherein the term "ContentProviderInfo" is a unique identifier for a content provider, for example, the deployment manager itself, an arbitrary service provider, a word processing document, or an HTML page; the term "ContentServerInfo" is used to identify a content server, and to locate configuration information in order to establish a connection with a server; and the term "ApplicationComponentInfo" is the portion that identifies the specific application entity, of which format and content is defined by for each content provider type. A DM-ID must contain the ContentProviderInfo, but all subsequent fields are optional.

In order to define an application the deployment engine 240 must first determine which application components 44 are available from each of the content servers in the environment. As is shown in the following code of the embodiment, the 'GetApplicationComponents' request retrieves the list of application components 44 supported by the given content server. An 'ApplicationDefinition' 42 is then created which contains a list of application components 44 that are to be included in the application. In the deployment manager of the invention the portal server is the only content server with an application entry point, therefore it is the only content provider that will be asked for its application components. In other embodiments, any similar content manager or server may play the same role as does the portal server within the embodiment described herein.

Client Request (to Deployment Engine)

```
<Request version="1.0" locale="en-ca" synchronous="true">
    <Command>
        <GetApplicationComponents>
            <ContentServer cdmID="dm://PRODUCT1/prod1:20" securityID="SecId1" />
        </GetApplicationComponents>
    </Command>
</Request>
```

Deployment Engine Request (to Content Providers)

```
<Request version="1.0" locale="en-ca" synchronous="true">
    <SecurityDescriptor class="Security" securityID="SecId1">
        <SecurityNamespace>NamespaceName</SecurityNamespace>
        <SecurityTicket>3131643595U4lWAlDRMX</SecurityTicket>
    </SecurityDescriptor>
    <Command>
        <GetApplicationComponents>
            <ContentServer cdmID="dm://PRODUCT1/prod1:20" securityID="SecId1" />
        </GetApplicationComponents>
    </Command>
```

-continued

```
</Request>
```

Content Provider Response
(also Deployment Engine Response to the Client)

```
<Response>
    <Status successful="true"/>
    <Result>
        <ContentServer cdmID="dm://PRODUCT1/prod1:20/" securityId="SecId1">
            <ApplicationComponent cdmID="dm://PRODUCT1/prod1:20/UserApplication" />
        </ContentServer>
    </Result>
</Response>
```

The following code snippet is an example of application definition produced by the application definition step 40 of the invention.

```
<ApplicationDefinition>
    <ApplicationComponent cdmID="dm://PRODUCT1/prod1:20/UserApplication" securityID=" SecId1"/>
</ApplicationDefinition>
```

3. Defining a Package Definition—Step 60

One significant feature of the invention is that the creation of an application package is based on a "define then pack" operational mode. As is illustrated in FIG. 1, a package defining step 60 is carried out before actually creating an application package in the step 80. This aspect of the invention is useful in an interactive environment in which the actual application package creation may be time consuming. More importantly, the "define then pack" mode may be geared to the support of the unattended creation of application packages on a scheduled basis from a fixed package definition. Hence, the successful deployment of an application depends on the creation of a perfect package definition.

Referring to FIGS. 1 and 2, the package defining step 40 is described below. As is depicted in FIG. 2, the package definition comprises the application definition 42 from the step 40 and a packlet definition 64 associated with each application entity 44a of the application definition 42, and, preferably, may further include a set of deployment policies 66. When the environment defining step 20 has been carried out, the configuration definition 22 may be included in the package definition 62. The terms "packlet" and "packlet definition" will be explained hereafter in more detail.

One of the major activities of the package defining step 60 is creating the packlet definition 64 associated with each application entity 44a, which is an element of the application component 44 as described in the step 40. The other one is gathering all the deployment policies 66 which may be associated with each of the application components 44 or application entities 44a.

Deployment policies are information and prescriptions which provide necessary information for successful packing and installation of an application package during the subsequent steps. In FIG. 2, the deployment policies 66 may include at least one of a global policy 66a, a packing policy 66b, a behavioural policy 66c, and a mapping policy 66d, or their every possible combination. The global policy 66a is a general policy which applies to a specific environment and is stored as part of a package definition or application package. However, it is possible to have separate files which contain only policies. The packing policies 66b dictates how an application package is created. The behavioural policies 66c dictates how to respond to a specific situation. The example of the response to a file replacement situation is typical. The mapping policies 66d indicates how values which existed in the source environment relate to values in the target environment. These values may include server names, path names, file names, URLs, and security system user class names.

Preferably, the package definition may be written to a structured document and saved and updated. The package definitions may be used repeatedly because they are based on application components rather the specific documents and other information which comprise the application component. The outcome of the completed definition phase is a package definition which contains a policy-based definition of the application. The advantage of the policy-based definition is that a package definition may be defined once and then packed many times.

A way in which a package definition is created will become more apparent to those skilled in the art by referring to the following description and example code snippet.

A Preferred Embodiment for the Package Defining Step

Similar to the previous steps, this embodiment will be described in conjunction with the activities and functions of the deployment manager 200 shown in FIG. 3. A more concrete understanding of the example code snippet will be provided by reference to the Appendix: Document Type Description.

As is described above, the deployment policies are information and prescriptions which provide the necessary information for the successful packing or installation of an application package during the subsequent steps. All policies are associated with an application entity although these application entities may be as narrow as a specific file or as broad as the deployment manager. Because every entity is part of a directed graph rooted in the deployment manager, there is a path from each application entity to the deployment manager. All policies defined on the path from an application entity to that root apply to the entity (i.e., policies are inherited). When two or more policies apply to an application entity in a specific situation, the policy closest to the entity on the path is the one which is used.

Each content server provides information on how its application component is partitioned in several application entities. The packing policies govern which portion of their content should be stored in a packlet. Each packing policy must have a default value defined by the content server, and this value may be invariant or configurable (e.g., some kind of policy file).

As shown in the following code snippet of the embodiment, the process of defining a package begins with a request for the default package definition for a given application definition. This package definition is then modified to meet the needs of the present deployment scenario. The 'GetPackageDefinition' request retrieves the default package definition for a given application definition. In order to create the 'PackageDefinition' the deployment engine 240 requests a 'PacketDefinition' from each of the content providers 260. This 'PacketDefinition' contains details about all the application entities that need to be packed in the next step 80. 'GetPackletDefinition' request is used by the deployment engine 240 to retrieve the dependency details for a particular content provider 260. This information is used to determine the set of content providers 260 that needs to create packlets.

Client Request (to Deployment Engine)

```
<Request version="1.0" locale="en-ca" synchronous="true">
    <SecurityDescriptor class="Security" securityID="SecId1">
        <SecurityNamespace>NamespaceName</SecurityNamespace>
        <SecurityTicket>3131643595U4lWAlDRMX</SecurityTicket>
    </SecurityDescriptor>
    <Command>
        <GetPackageDefinition>
            <ApplicationDefinition>
                <ApplicationComponent      cdmID="dm://PRODUCT1/prod1:20" securityID="ScId1" />
            </ApplicationDefinition>
        </GetPackageDefinition>
    </Command>
</Request>
```

Deployment Engine Request (to Content Providers)

```
<Request synchronous="true" version="1.0" locale="en-us">
    <SecurityDescriptor class="Security" securityID="SecId1">
        <SecurityNamespace>NamespaceName</SecurityNamespace>
        <SecurityTicket>3131643595U4lWAlDRMX</SecurityTicket>
    </SecurityDescriptor>
    <Command>
        <GetPackletDefinition>
            <ApplicationEntity cdmID="dm://PRODUCT1/prod1:20" securityID="SecId1" />
        </GetPackletDefinition>
    </Command>
</Request>
```

Content Provider Response (to Deployment Engine)

-continued

```
<Response>
    <Status successful="true"/>
    <Result>
        <PackletDefinition>
            <Properties>
                <Property       propertyID="PRODUCT1.packPersonal"
                                style="fixed_list" datatype="boolean"
group="General">
                    <Description>Should personal newsboxes be
                    included?</Description>
                    <Label>Pack personal newsboxes?</Label>
                    <Choices>
                        <Choice>
                            <Value>true</Value>
                            <Display>Yes</Display>
                        </Choice>
                        <Choice>
                            <Value>false</Value>
                            <Display>No</Display>
                        </Choice>
                    </Choices>
                    <DefaultValue>true</DefaultValue>
                </Property>
            </Properties>
            <ApplicationEntity cdmID="dm://PRODUCT1">
                <ApplicationEntity cdmID="dm://PRODUCT1/prod1:20"
securityID="SecId1">
                    <ApplicationEntity
cdmID="dm://PRODUCT1/prod1:20/UserApplication">
                        <Policies>
                            <PropertyRef
propertyID="PRODUCT1.packPersonal"/>
                        </Policies>
                        <ApplicationEntityRef
cdmID="dm://PRODUCT3/prod3:2000/" />
                        <ApplicationEntityRef cdmID=
                            "dm://PRODUCT2/prod2:389/ns1" />
                    </ApplicationEntity>
                </ApplicationEntity>
            </ApplicationEntity>
        </PackletDefinition>
    </Result>
</Response>
```

Deployment Engine Response (to Client)

```
<Response>
    <Status sucessful="true" />
    <Result>
        <PackageDefinition>
            <ApplicationDefinition>
                <ApplicationComponent cdmID="dm://PRODUCT1/prod1:20"
securityID="SecId1"/>
            </ApplicationDefinition>
            <Properties>
                <Property       propertyID="PRODUCT1.packPersonal"
                        style="fixed_list" datatype="boolean" group="General">
                    <Description>Should personal newsboxes be
                    included?</Description>
                    <Label>Pack personal newsboxes?</Label>
                    <Choices>
                        <Choice>
                            <Value>true</Value>
                            <Display>Yes</Display>
                        </Choice>
                        <Choice>
                            <Value>false</Value>
                            <Display>No</Display>
                        </Choice>
                    </Choices>
                    <DefaultValue>true</DefaultValue>
                </Property>
            </Properties>
            <ApplicationEntity cdmID="dm://">
                <ApplicationEntity cdmID="dm://PRODUCT1">
                    <ApplicationEntity cdmID="dm://PRODUCT1/prod1:20"
                        securityID="SecId1">
                        <ApplicationEntity
cdmID="dm://PRODUCT1/prod1:20/UserApplication">
```

-continued

```
            <Policies>
                <PropertyRef propertyID="PRODUCT1.packPersonal"/>
            </Policies>
            <ApplicationEntityRef cdmID="dm://PRODUCT3/prod3:2000/"/>
            <ApplicationEntityRef cdmID="dm://PRODUCT2/
prod2:389/ns1" />
            </ApplicationEntity>
          </ApplicationEntity>
        </ApplicationEntity>
        <ApplicationEntity cdmID="dm://PRODUCT3">
          <ApplicationEntity cdmID="dm://PRODUCT3/prod3:2000"
          securityID="SecId1">
            <ApplicationEntityRef cdmID="dm://PRODUCT2/prod2:389/ns1" />
          </ApplicationEntity>
        </ApplicationEntity>
        <ApplicationEntity cdmID="dm://PRODUCT2">
          <ApplicationEntity cdmID="dm://PRODUCT2/prod2:389">
            <ApplicationEntity        cdmID="dm://PRODUCT2/prod2:389/ns1"
            securityID="SecId1" />
          </ApplicationEntity>
        </ApplicationEntity>
      </ApplicationEntity>
    </PackageDefinition>
  </Command>
</Request>
```

4. Creating an Application Package—Step 80

According to the 'define then pack' principle of the invention, after creating a package definition, an application package is created according to the definition. The application package contains all the necessary information required to successfully deploy an application in the target system (environment).

In general, the application package creating step 80 shown in FIG. 1 comprises steps of creating a set of packlets associated with each application entity, singling out fix-ups which are to be resolved on the target environment, and creating an application package containing all the information required to install an application. As is shown in FIG. 2, an application package 82 comprises the package definition 62 generated from the step 60, a set of packlets 84, a list of the packlets 85, fix-ups 86, a graph 87, and a set of deployment policies 88. Further, the deployment policies 88 may include dependency policies 88a, mapping policies 88b, and installation policies 88c. The packlet 84 represents a collection of various items necessary to build an application component. Preferably, the data stored in a packlet may be portable or platform independent. More preferably, the packlet 84 may be a file or a tree of files which are stored in a known directory which may be moved from the source environment to the target environment. During this process, all the fix-ups 86 that have to be resolved on the target environment are selected. The application package file contains all the content of the package definition upon which it is based, details concerning the content of the package, dependency policies 88a generated during packing to express dependencies within and between components, a list of all packlets 85 which were created during the packing operation, and a graph 87 that specify the sequence in which the application entities should be installed in the target environment.

An application package may be created in the same way regardless of the type of package that is being created, i.e., a new application package that contains the whole application, or an application package update.

A way in which an application package is produced will become more apparent to those skilled in the art by referring to the following description and example code snippet.

A Preferred Embodiment for the Application Package Creating Step

Similar to the previous steps, this embodiment will be described in conjunction with the activities and functions of the deployment manager 200 shown in FIG. 3. A more concrete understanding of the example code snippet will be provided by reference to the Appendix: Document Type Description.

At the conceptual level, creating an application package 82 is a simple repetitive packing operation. The deployment manager 200 begins with a list of application components 44 represented by their DM-IDs. It takes DM-IDs from the list and performs the following steps until the list is empty; 1. Examine the DM-ID to determine which content provider 260 can process it. 2. Request the content provider 260 pack the DM-ID, passing all packing policies. 3. Receive from the provider: a list of application entities packed, a list of packlets created, a list of new mapping policy entries, and a list of DM-IDs for dependent entities to be packed. 4. Add the returned list of DM-IDs for dependent entities to the list of DM-IDs to be packed.

As is shown in the following code snippet of the embodiment, the 'CreatePackage' request is used to generate an application package for a given package definition. The result is a 'Package' document. Then, the 'CreatePacklet' is used by the deployment engine 240 to initiate the packing operation for a given content provider 260. The result of this request is a 'Packlet' document. This embodiment illustrates this operation as carried out by the portal or other content management provider. Note the additional details contained in the 'ApplicationEntityRefs'. Rather than simply stating a dependency on a content server, the dependencies now include details about the content. This information is passed to the other providers as part of their 'CreatePacklet' request.

After all the application entities are packaged, the deployment manager iterates through each packlet to package fixup information. There may be a possibility that a content provider needs to pack additional information in order to be able to resolve fixups on the target environment. This information may be found in an existing packlet or a new packlet may be created to ease the separation of content on the target environment.

```
Client Request (to Deployment Engine)
<Request version="1.0" locale="en-ca" synchronous="true">
    <SecurityDescriptor class="Security" securityID="SecId1">
        <SecurityNamespace>NamespaceName</SecurityNamespace>
        <SecurityTicket>3131643595U4lWAlDRMX</SecurityTicket>
    </SecurityDescriptor>
    <Command><CreatePackage>
        <PackageDefinition>
            <ApplicationDefinition>
                <ApplicationComponent cdmID="dm://PRODUCT1/prod1:20"
                securityID="SecId1"/>
            </ApplicationDefinition>
            <Properties>
                <Property     propertyID="PRODUCT1.packPersonal"
                style="fixed_list"
                datatype="boolean"
                group="General">
                    <Description>Should personal newsboxes be
                    included?</Description>
                    <Label>Pack personal newsboxes?</Label>
                    <Choices>
                        <Choice>
                            <Value>true</Value>
                            <Display>Yes</Display>
                        </Choice>
                        <Choice>
                            <Value>false</Value>
                            <Display>No</Display>
                        </Choice>
                    </Choices>
                    <DefaultValue>true</DefaultValue>
                </Property>
            </Properties>
            <ApplicationEntity cdmID="dm://">
                <ApplicationEntity cdmID="dm://PRODUCT1">
                    <ApplicationEntity cdmID="dm://PRODUCT1/prod1:20"
                    securityID="SecId1">
                    <ApplicationEntity
                    cdmID="dm://PRODUCT1/prod1:20/UserApplication">
                        <Policies>
                            <PropertyRef propertyID="PRODUCT1.packPersonal">
                                <Value>false</Value>
                            </PropertyRef>
                        </Policies>
                        <ApplicationEntityRef
                        cdmID="dm://PRODUCT3/prod3:2000/" />
                            <ApplicationEntityRefcdmID="dm://PRODUCT2/prod2:389/ns1"/>
                    </ApplicationEntity>
                    </ApplicationEntity>
                </ApplicationEntity>
                <ApplicationEntity cdmID="dm://PRODUCT3">
                    <ApplicationEntity cdmID="dm://PRODUCT3/prod3:2000"
                    securityID="SecId1">
                        <ApplicationEntityRef cdmID="dm://PRODUCT2/prod2:389/ns1" />
                    </ApplicationEntity>
                </ApplicationEntity>
                <ApplicationEntity cdmID="dm://PRODUCT2">
                    <ApplicationEntity cdmID="dm://PRODUCT2/prod2:389">
                        <ApplicationEntity     cdmID="dm://PRODUCT2/prod2:389/ns1"
                        securityID="SecId1" />
                    </ApplicationEntity>
                </ApplicationEntity>
            </ApplicationEntity>
        </PackageDefinition>
    </CreatePackage></Command>
</Request>
Deployment Engine Request (to Content Providers)
<Request synchronous="true" version="1.0" locale="en-us">
    <SecurityDescriptor class="Security" securityID="SecId1">
        <SecurityNamespace>NamespaceName</SecurityNamespace>
        <SecurityTicket>3131643595U4lWAlDRMX</SecurityTicket>
    </SecurityDescriptor>
    <Command>
        <CreatePacklet>
            <PackletDefinition>
                <Properties>
                    <Property     propertyID="PRODUCT1.packPersonal"
                    style="fixed_list" datatype="boolean" group="General">
                        <Description>Should personal newsboxes be
```

```
                        included?</Description>
                        <Label>Pack personal newsboxes?</Label>
                        <Choices>
                            <Choice>
                                <Value>true</Value>
                                <Display>Yes</Display>
                            </Choice>
                            <Choice>
                                <Value>false</Value>
                                <Display>No</Display>
                            </Choice>
                        </Choices>
                        <DefaultValue>true</DefaultValue>
                    </Property>
                </Properties>
                <ApplicationEntity cdmID="dm://PRODUCT1">
                    <ApplicationEntity cdmID="dm://PRODUCT1/prod1:20"
                    securityID="SecId1">
                        <ApplicationEntity
                        cdmID="dm://PRODUCT1/prod1:20/UserApplication">
                            <Policies>
                                <PropertyRef propertyID="PRODUCT1.packPersonal">
                                    <Value>false</Value>
                                </PropertyRef>
                            </Policies>
                            <ApplicationEntityRef cdmID="dm://PRODUCT3/prod3:2000/" />
                            <ApplicationEntityRef cdmID="dm://PRODUCT2/prod2:389/ns1" />
                        </ApplicationEntity>
                    </ApplicationEntity>
                </ApplicationEntity>
            </PackletDefinition>
        </CreatePacklet>
    </Command>
</Request>
Content Provider Response (to Deployment Engine)
<Response>
    <Status successful="true"/>
    <Result>
        <Packlet>
            <PackletDefinition>
                <!-- Removed for clarity. Identical to one provided as input. -->
            </PackletDefinition>
            <Properties>
                <Property      propertyID="PRODUCT1.packletLocation"
                style="edit_text"
                datatype="file_path" group="General">
                    <Description>Product1 packlet location</Description>
                    <Label>Packlet location</Label>
                </Property>
            </Properties>
            <ApplicationEntity cdmID="dm://PRODUCT1">
                <ApplicationEntity cdmID="dm://PRODUCT1/prod1:20"
                securityID="SecId1">
                    <ApplicationEntity
                    cdmID="dm://PRODUCT1/prod1:20/UserApplication">
                        <Mappings>
                            <Mapping class="packlet"
                            propertyID="PRODUCT1.packletLocation">
                                <SourceValue>
                                    //FileServer/Packlets/prod1.pak
                                </SourceValue>
                            </Mapping>
                        </Mappings>
                        <Fixups>
                            <Fixup cdmID="dm:://PRODUCT2/prod2:389/ns1/UC/UC1">
                                <SourceValue>UC1ID</SourceValue>
                            </Fixup>
                            <Fixup cdmID="dm:://PRODUCT2/prod2:389/ns1/UC/UC2">
                                <SourceValue>UC2ID</SourceValue>
                            </Fixup>
                            <Fixup cdmID="dm:://PRODUCT2/prod2:389/ns1/UC/UC3">
                                <SourceValue>UC3ID</SourceValue>
                            </Fixup>
                        </Fixups>
                        <ApplicationEntityRef cdmID="dm://PRODUCT3/prod3:2000/">
                            <ApplicationEntityRef
                            cdmID="dm://PRODUCT3/prod3:2000/NID1"/>
                            <ApplicationEntityRef
                            cdmID="dm://PRODUCT3/prod3:2000/NID2"/>
```

-continued

```
                    <ApplicationEntityRef
                        cdmID="dm://PRODUCT3/prod3:2000/NID3"/>
                    <ApplicationEntityRef
                        cdmID="dm://PRODUCT3/prod3:2000/NID4"/>
                    <ApplicationEntityRef
                        cdmID="dm://PRODUCT3/prod3:2000/NID5"/>
                    <ApplicationEntityRef
                        cdmID="dm://PRODUCT3/prod3:2000/NID6"/>
                    <ApplicationEntityRef
                        cdmID="dm://PRODUCT3/prod3:2000/NID7"/>
                </ApplicationEntityRef>
                <ApplicationEntityRef cdmID="dm://PRODUCT2/prod2:389/ns1"/>
            </ApplicationEntity>
        </ApplicationEntity>
    </ApplicationEntity>
  </Packlet>
 </Result>
</Response>
Deployment Engine Response (to Client)
<Response>
    <Status sucessful="true" />
    <Result>
        <Package>
            <PackageDefinition>
                <!-- Removed for clarity. Identical to one provided as input. -->
            </PackageDefinition>
            <Properties>
                <Property    propertyID="PRODUCT1.packletLocation"
                style="edit_text"
                        datatype="file_path" group="General">
                    <Description>Product1 packlet location</Description>
                    <Label>Packlet location</Label>
                </Property>
                <Property    propertyID="PRODUCT3.packletLocation"
                style="edit_text"
                        datatype="file_path" group="General">
                    <Description>PRODUCT3 Packlet file location</Description>
                    <Label>Packlet location</Label>
                </Property>
                <Property    propertyID="PRODUCT2.packletLocation"
                style="edit_text" datatype="file_path" group="General">
                    <Description>Security System Packlet file
                    location</Description>
                    <Label>Packlet location</Label>
                </Property>
                <Property    propertyID="PRODUCT2.conflict" style="fixed_list"
                datatype="string" group="General">
                    <Description>Overwrite or merge?</Description>
                    <Label>Conflict policy</Label>
                    <Choices>
                        <Choice>
                            <Value>merge</Value>
                            <Display>Merge with Target</Display>
                        </Choice>
                        <Choice>
                            <Value>overwrite</Value>
                            <Display>Overwrite Target</Display>
                        </Choice>
                    </Choices>
                    <DefaultValue>overwrite</DefaultValue>
                </Property>
                <Property    propertyID="PRODUCT2.merge" style="fixed_list"
                datatype="string" group="General">
                    <Description>How should a merge operation be
                    handled?</Description>
                    <Label>Merge policy</Label>
                    <Choices>
                        <Choice>
                            <Value>source</Value>
                            <Display>Keep Source</Display>
                        </Choice>
                        <Choice>
                            <Value>target</Value>
                            <Display>Keep Target</Display>
                        </Choice>
                    </Choices>
                    <DefaultValue>target</DefaultValue>
                </Property>
            </Properties>
```

```xml
<ApplicationEntity cdmID="dm://">
    <ApplicationEntity cdmID="dm://PRODUCT1">
        <ApplicationEntity cdmID="dm://PRODUCT1/prod1:20"
        securityID="SecId1">
            <ApplicationEntity
            cdmID="dm://PRODUCT1/prod1:20/UserApplication">
                <Mappings>
                    <Mapping class="packlet"
                    propertyID="PRODUCT1.packletLocation">
                        <SourceValue>
                            //FileServer/Packlets/prod1.pak
                        </SourceValue>
                    </Mapping>
                </Mappings>
                <Fixups>
                    <Fixup cdmID="dm:://PRODUCT2/prod2:389/ns1/UC/UC1">
                        <SourceValue>UC1ID</SourceValue>
                    </Fixup>
                    <Fixup cdmID="dm:://PRODUCT2/prod2:389/ns1/UC/UC2">
                        <SourceValue>UC2ID</SourceValue>
                    </Fixup>
                    <Fixup cdmID="dm:://PRODUCT2/prod2:389/ns1/UC/UC3">
                        <SourceValue>UC3ID</SourceValue>
                    </Fixup>
                </Fixups>
                <ApplicationEntityRef cdmID="dm://PRODUCT3/prod3:2000/">
                <ApplicationEntityRef cdmID="dm://PRODUCT2/prod2:389/ns1"/>
            </ApplicationEntity>
        </ApplicationEntity>
    </ApplicationEntity>
    <ApplicationEntity cdmID="dm://PRODUCT3">
        <ApplicationEntity cdmID="dm://PRODUCT3/prod3:2000"
        securityID="SecId1">
            <Mappings>
                <Mapping class="packlet" mappingID="packlet1"
                propertyID="PRODUCT3.packletLocation">
                    <SourceValue>//FileServer/Packlets/
                    prod3_1.pak</SourceValue>
                </Mapping>
                <Mapping class="packlet" mappingID="packlet2"
                propertyID="PRODUCT3.packletLocation">
                    <SourceValue>//FileServer/Packlets/
                    prod3_2.pak</SourceValue>
                </Mapping>
            </Mappings>
            <Fixups>
                <Fixup cdmID="dm:://PRODUCT2/prod2:389/ns1/UC/UC3">
                    <SourceValue>UC3ID</SourceValue>
                </Fixup>
                <Fixup cdmID="dm:://PRODUCT2/prod2:389/ns1/UC/UC4">
                    <SourceValue>UC4ID</SourceValue>
                </Fixup>
                <Fixup cdmID="dm:://PRODUCT2/prod2:389/ns1/UC/UC7">
                    <SourceValue>UC7ID</SourceValue>
                </Fixup>
                <Fixup
                cdmID="dm:://PRODUCT2/prod2:389/ns1/Certificate/C1">
                    <SourceValue>C1Value</SourceValue>
                </Fixup>
            </Fixups>
            <ApplicationEntityRef cdmID="dm://PRODUCT2/prod2:389/ns1" />
        </ApplicationEntity>
    </ApplicationEntity>
    <ApplicationEntity cdmID="dm://PRODUCT2">
        <ApplicationEntity cdmID="dm://PRODUCT2/prod2:389">
            <ApplicationEntity cdmID="dm://PRODUCT2/prod2:389/ns1"
            securityID="SecId1">
                <Policies>
                    <PropertyRef propertyID = "PRODUCT2.conflict" />
                    <PropertyRef propertyID = "PRODUCT2.merge" />
                </Policies>
                <Mapping class="packlet"
                propertyID="PRODUCT2.packletLocation">
                    <SourceValue>//FileServer/Packlets/ns1.lae</SourceValue>
                </Mapping>
            </ApplicationEntity>
        </ApplicationEntity>
    </ApplicationEntity>
</ApplicationEntity>
```

```
        </Package>
    </Result>
</Response>
```

5. Transferring an Application Package—Step 100

Once an application package has been produced, it may be necessary to move it to a new environment. In some instances, all elements of the target environment are accessible from the system on which the application package is created. In this case, the package installation can be performed in conjunction with the application package creation and the package transfer is an implicit part of these combined activities.

However, when there is a necessity of physically moving the application package, it may be preferable that, in order to facilitate it, a file containing a list of all the application contents be generated and transferred to the target environment as part of the work of moving the application package. This may be done in terms of individual packlet files. Alternatively, the application package may be stored on a shared directory on a network so that physical movement of it to a connected environment can be avoided.

6. Installing an Application Package—Step 120

The application package installation step 120 in FIG. 1 comprises steps of specifying information to be required for installing the application package and placing the application package content into the target environment. Preferably the installation step may further include a step of validating the installation before placing the application package. The information specifying step specifies all the information which is required for a successful installation of the application and provides a preview of the changes which will result from the installation. The application content placing step actually places the application content in the target environment and performs such changes to the environment as required to make the application function effectively.

(1) Specifying Information to be Required for Installation

Preferably, the information specifying step involves three activities: a. Selecting application components to be installed in the target environment. b. Completing mapping of the various entities which were generated during the application package creating step. c. Defining polices to resolve content conflicts which may arise during the next application content placing step.

a. Selecting Application Components to be Installed

It is necessary to define which application components are to be installed in the target environment. Application entities are selected from the list of application entities that are available from the application package.

b. Completing Mapping of Entities

When the source and target environments are not the same, all references to the source environment may have to change as a result of the movement to the target environment. The following are examples of the types of mapping that exist:

Packlet mapping: The application package contains information on the packlet location of each application entity. These locations are relative to the source environment and may be different on the target environment. If no mapping is provided, then it is assumed that the location has not changed. The packlet location is relative to the content server packlet path, thus allowing selection of a default location for the packlet location.

Target mapping: Each content server, from the source environment, that has an application entity stored in the application package may be mapped to a different content server on the target environment. It is necessary to map content servers in the source environment to content servers in the target environment. It should be noted that application entities which reside on a single content server may be split across several content servers by overriding the server location at the application entity level.

Custom mapping: Generic mappings that have no special order of precedence that must be followed when configuring the installation.

c. Defining Policies to Resolve Content Conflicts

Additional policies may also be specified. One set of policies is the conflict resolution policies which determine the handling of instances in which content in the target environment conflicts with content in the application package. Another set is the fixup policies which are polices created at installation time by individual content providers which dictate installation actions which must be performed by other content providers to assure the consistency of installed application content.

Conflict resolution policies govern the behaviour of the placement of content on the target environment. Each application entity may have conflict resolution policies, which may be shared amongst one or more application entities.

The most problematic issue in the installation process is the resolution of application entity conflicts. The critical character of the conflict resolution activity is that it identifies potential conflicts and gathers rules to govern the resolution of such conflicts during the placement phase. It makes no changes to its environment. The conflict resolution choices for the installation of a package in a specific target environment become part of the package definition.

There is a special conflict case which requires that the package definition be installed as part of the installation process: It is possible that an application entity existed in a prior installation and has since changed in both the source and the target environment. In this case, the application entity cannot simply be updated. Because of this case, the package definition is persisted as part of installation.

The use, storage and installation of package definitions provide a mechanism which can simplify the processing of conflicts. A knowledge of what the existing package definition is supposed to be, what the expected package definition is supposed to be, and what actually exists in the operational environment permits a prior determination of whether any conflicts will arise during the installation. This means that, in the interactive case, the user can select policies to change, rename or move application components causing conflicts before the installation occurs. With this approach, conflicts are resolved before installation and installation can, or should be able to, proceed without any need for conflict resolution.

The use of the package definition information to perform a prior conflict resolution is consistent with the "define then pack" mode of package creation. This inverse process is "validate then install." The use of this strategy has several advantages:

It permits the resolution and installation activities to be temporally separated.

It is efficient in the use of user time.

It requires no action unless a conflict actually exists.

(2) Validating Installation

Once policies have been defined, the package may be validated. This operation examines the application package and the target environment and indicates what changes would actually occur during installation without actually making any of those changes. One of the principal values of the validation operation is that it identifies conflict situations for which no policies have been defined. Users may thus iterate policy definition and validation until the expected outcome of installation is acceptable.

The pre-install validation performs all the steps that it would take during an installation without overwriting any of the content on the destination. This is very useful if the user wants to find out which application content would be affected by an installation.

(3) Placing Contents of an Application Package

The placement of application contents in the target environment is the inverse of the packing operation. Content providers are directed to process the packlets of the type which they created them in reverse order of creation. This causes the content to be unpacked and placed in inverse dependency order. The content provider is provided with the name and location of the packlet and has access to all applicable policy. As a result of placing the content, the content provider may return additional policy data which must be added to the policy which is passed as part of subsequent unpack operations.

The order of installation is based on the directed graph found in the application package, starting with the child of a node and working our way to the root (i.e., a depth-first algorithm). This means that all the dependencies of an application entity are installed before the application entity is installed.

A way in which an organized application is successfully installed to a target environment will become more apparent to those skilled in the art by referring to the following description and example code snippet.

A preferred Embodiment for the Application Package Installing Step

Similar to the previous steps, this embodiment will be described in conjunction with the activities and functions of the deployment manager 200 shown in FIG. 3. A more concrete understanding of the example code snippet will be provided by reference to the Appendix: Document Type Description.

The deployment manager 200 may present a pre-deploy checklist to the user. This list includes details of all the actions that it will attempt to perform and additional text outlining any steps that must be performed manually either before or after deployment.

Users need to know what is going to happen to their systems before the action of deployment takes place and to have an action list for tasks that they have to manually perform. Ideally the user will be able to easily reference this information after deployment.

The deployment manager must assist the user in his choice of mapping since the deployment of one application entity to the wrong destination can break the application. The idea is not to restrict what the user can do but to guide them as much as possible so they are aware of the consequences of their decisions.

Validation is an operation in which the deployment manager follows all the steps which would be part of the content placement operation, but in which the content providers make no changes to the target environment. The purpose is to allow users to assess whether a content placement operation would be successful and what its effect would be. If results are not acceptable, policies (or the target environment contents) may be changed to produce the correct result.

As shown in the following code snippet of the embodiment, the 'GetMappingChoices' request is used, by the user interface 220, to get a list of possible choices for a mapping based on the current configuration of the packlet. Before this is called, the server mappings need to have been filled out. This request may be called multiple times as the user fills in more mapping information.

```
Client Request (to Deployment Engine)
<Request version="1.0" locale="en-ca" synchronous="true">
    <SecurityDescriptor class="Security" securityID="SecId1">
        <SecurityNamespace>NamespaceName</SecurityNamespace>
        <SecurityTicket>3131643595U4lWAlDRMX</SecurityTicket>
    </SecurityDescriptor>
    <Command>
        <GetMappingChoices>
            <Package>
                <!-- Rest of package removed for clarity -->
                <Mapping class="packlet" propertyID="PRODUCT1.packletLocation">
                    <SourceValue>
                        //FileServer/Packlets/prod1.pak
                    </SourceValue>
                </Mapping>
                <Mapping class="content" propertyID="examplemapping">
                    <SourceValue>SourceValue</SourceValue>
                </Mapping>
                <!-- Rest of package removed for clarity -->
            </Package>
        </GetMappingChoices>
    </Command>
</Request>
Deployment Engine Request (to Content Providers)
<Request version="1.0" locale="en-ca" synchronous="true">
    <SecurityDescriptor class="Security" securityID="SecId1">
        <SecurityNamespace>NamespaceName</SecurityNamespace>
```

-continued

```
            <SecurityTicket>3131643595U4lWAlDRMX</SecurityTicket>
        </SecurityDescriptor>
        <Command>
            <GetMappingChoices>
                <Packlet>
                    <!-- Rest of packlet removed for clarity -->
                    <Mapping class="packlet" propertyID="PRODUCT1.packletLocation">
                        <SourceValue>
                            //FileServer/Packlets/prod1.pak
                        </SourceValue>
                    </Mapping>
                    <Mapping class="content" propertyID="PRODUCT1.examplemapping">
                        <SourceValue>SourceValue</SourceValue>
                    </Mapping>
                    <!-- Rest of packlet removed for clarity -->
                </Packlet>
            </GetMappingChoices>
        </Command>
</Request>
Content Provider Response (to Deployment Engine)
<Response>
    <Status successful="true"/>
    <Result>
        <Packlet>
            <!-- Rest of packlet removed for clarity -->
            <Mapping class="packlet" propertyID="PRODUCT1.packletLocation">
                <SourceValue>//FileServer/Packlets/prod1.pak</SourceValue>
                <TargetValue>//FileServer/Packlets/prod1.pak</TargetValue>
            </Mapping>
            <Mapping class="content" propertyID="PRODUCT1.examplemapping">
                <SourceValue>SourceValue</SourceValue>
                <Choices>
                    <Choice>
                        <Value>1<Value><Display>First Choice</Display>
                    </Choice>
                    <Choice>
                        <Value>2<Value><Display>Second Choice</Display>
                    </Choice>
                    <Choice>
                        <Value>3<Value><Display>Third Choice</Display>
                    </Choice>
                </Choices>
            </Mapping>
            <!-- Rest of packlet removed for clarity -->
        </Packlet>
    </Result>
</Response>
Deployment Engine Response (to Client)
<Response>
    <Status successful="true"/>
    <Result>
        <Package>
            <!-- Rest of package removed for clarity -->
            <Mapping class="packlet" propertyID="PRODUCT1.packletLocation">
                <SourceValue>//FileServer/Packlets/prod1.pak</SourceValue>
                <TargetValue>//FileServer/Packlets/prod1.pak</TargetValue>
            </Mapping>
            <Mapping class="content" propertyID="examplemapping">
                <SourceValue>SourceValue</SourceValue>
                <Choices>
                    <Choice>
                        <Value>1<Value><Display>First Choice</Display>
                    </Choice>
                    <Choice>
                        <Value>2<Value><Display>Second Choice</Display>
                    </Choice>
                    <Choice>
                        <Value>3<Value><Display>Third Choice</Display>
                    </Choice>
                </Choices>
            </Mapping>
            <!-- Rest of package removed for clarity -->
        </Package>
    </Result>
</Response>
```

The 'ResolveFixup' request is used by the deployment engine 240 during the installation process. The content provider 260 must map the values in the 'Fixups' document into the new environment. This process is used to map environment specific information such as security system IDs.

```
Deployment Engine Request
<Request version="1.0" locale="en-ca" synchronous="true">
    <SecurityDescriptor class="Security" securityID="SecId1">
        <SecurityNamespace>NamespaceName</SecurityNamespace>
        <SecurityTicket>3131643595U4lWAlDRMX</SecurityTicket>
    </SecurityDescriptor>
    <Command>
        <ResolveFixup>
            <Packlet>
                <PackletDefinition>
                    <!-- Removed for clarity. -->
                </PackletDefinition>
                <Properties>
                    <!-- Removed for clarity. -->
                </Properties>
                <ApplicationEntity cdmID="dm://PRODUCT2">
                    <ApplicationEntity cdmID="dm://PRODUCT2/prod2:389">
                        <ApplicationEntity         cdmID="dm://PRODUCT2/prod2:389/ns1"
                        securityID="SecId1">
                            <Policies>
                                <!-- Removed for clarity. -->
                            </Policies>
                            <Mapping class="packlet"
                            propertyID="PRODUCT2.packletLocation">
                                <!-- Removed for clarity. -->
                            </Mapping>
                            <Fixups>
                                <Fixup cdmID="dm:://PRODUCT2/prod2:389/ns1/UC/UC1">
                                    <SourceValue>UC1ID</SourceValue>
                                </Fixup>
                                <Fixup cdmID="dm:://PRODUCT2/prod2:389/ns1/UC/UC2">
                                    <SourceValue>UC2ID</SourceValue>
                                </Fixup>
                                <Fixup cdmID="dm:://PRODUCT2/prod2:389/ns1/UC/UC3">
                                    <SourceValue>UC3ID</SourceValue>
                                </Fixup>
                                <Fixup cdmID="dm:://PRODUCT2/prod2:389/ns1/UC/UC4">
                                    <SourceValue>UC4ID</SourceValue>
                                </Fixup>
                                <Fixup cdmID="dm:://PRODUCT2/prod2:389/ns1/UC/UC7">
                                    <SourceValue>UC7ID</SourceValue>
                                </Fixup>
                                <Fixup cdmID="dm:://PRODUCT2/prod2:389/ns1/Cert/C1">
                                    <SourceValue>C1Value</SourceValue>
                                </Fixup>
                            </Fixups>
                        </ApplicationEntity>
                    </ApplicationEntity>
                </ApplicationEntity>
            </Packlet>
        </ResolveFixup>
    </Command>
</Request>
Content Provider Response
<Response>
    <Status successful="true"/>
    <Result>
        <Packlet>
            <PackletDefinition>
                <!-- Removed for clarity. -->
            </PackletDefinition>
            <Properties>
                <!-- Removed for clarity. -->
            </Properties>
            <ApplicationEntity cdmID="dm://PRODUCT2">
                <ApplicationEntity cdmID="dm://PRODUCT2/prod2:389">
                    <ApplicationEntity         cdmID="dm://PRODUCT2/prod2:389/ns1"
                    securityID="SecId1">
                        <Policies>
                            <!-- Removed for clarity. -->
                        </Policies>
                        <Mapping class="packlet"
                        propertyID="PRODUCT2.packletLocation">
                            <!-- Removed for clarity. -->
```

-continued

```
                </Mapping>
                <Fixups>
                    <Fixup cdmID="dm:://PRODUCT2/prod2:389/ns1/UC/UC1">
                        <SourceValue>UC1ID</SourceValue>
                        <TargetValue>newID</TargetValue>
                    </Fixup>
                    <Fixup cdmID="dm:://PRODUCT2/prod2:389/ns1/UC/UC2">
                        <SourceValue>UC2ID</SourceValue>
                        <TargetValue>newID</TargetValue>
                    </Fixup>
                    <Fixup cdmID="dm:://PRODUCT2/prod2:389/ns1/UC/UC3">
                        <SourceValue>UC3ID</SourceValue>
                        <TargetValue>newID</TargetValue>
                    </Fixup>
                    <Fixup cdmID="dm:://PRODUCT2/prod2:389/ns1/UC/UC4">
                        <SourceValue>UC4ID</SourceValue>
                        <TargetValue>newID</TargetValue>
                    </Fixup>
                    <Fixup cdmID="dm:://PRODUCT2/prod2:389/ns1/UC/UC7">
                        <SourceValue>UC7ID</SourceValue>
                        <TargetValue>newID</TargetValue>
                    </Fixup>
                    <Fixup cdmID="dm:://PRODUCT2/prod2:389/ns1/Cert/C1">
                        <SourceValue>C1Value</SourceValue>
                        <TargetValue>newValue</TargetValue>
                    </Fixup>
                </Fixups>
            </ApplicationEntity>
        </ApplicationEntity>
    </ApplicationEntity>
    </Packlet>
    </Result>
</Response>
```

The 'InstallPackage' request serves two purposes. It is used to perform the validation and installation actions. When set to false, the execute attribute causes the request to simply validate the package installation. When set to true, the request actually performs the installation operation. Then, the 'InstallPacklet' request is used to start the installation process, or to pre-validate the installation. If the execute attribute is true the packlet is installed. Otherwise, a validation process takes place and tests whether the packlet can be installed successfully.

```
Client Request (to Deployment Engine)
<Request version="1.0" locale="en-ca" synchronous="true">
    <SecurityDescriptor class="Security" securityID="SecId1">
        <SecurityNamespace>NamespaceName</SecurityNamespace>
        <SecurityTicket>3131643595U4lWAlDRMX</SecurityTicket>
    </SecurityDescriptor>
    <Command><InstallPackage execute="true">
        <Package>
            <PackageDefinition>
                <!-- Removed for clarity. Identical to one provided as input. -->
            </PackageDefinition>
            <Properties>
                <Property       propertyID="PRODUCT1.packletLocation"
                style="edit_text"
                        datatype="file_path" group="General">
                    <Description> Product1 packlet location</Description>
                    <Label>Packlet location</Label>
                </Property>
                <Property       propertyID="PRODUCT3.packletLocation"
                style="edit_text"
                        datatype="file_path" group="General">
                    <Description>PRODUCT3 Packlet file location</Description>
                    <Label>Packlet location</Label>
                </Property>
                <Property       propertyID="PRODUCT2.packletLocation"
                style="edit_text" datatype="file_path" group="General">
                    <Description>Security System Packlet file
                    location</Description>
                    <Label>Packlet location</Label>
                </Property>
                <Property       propertyID="PRODUCT2.conflict" style="fixed_list"
                        datatype="string" group="General">
```

```
                    -continued

<Description>Overwrite or merge?</Description>
                <Label>Conflict policy</Label>
                <Choices>
                    <Choice>
                        <Value>merge</Value>
                        <Display>Merge with Target</Display>
                    </Choice>
                    <Choice>
                        <Value>overwrite</Value>
                        <Display>Overwrite Target</Display>
                    </Choice>
                </Choices>
                <DefaultValue>overwrite</DefaultValue>
            </Property>
            <Property    propertyID="PRODUCT2.merge" style="fixed_list"
                    datatype="string" group="General">
                <Description>How should a merge operation be
                handled?</Description>
                <Label>Merge policy</Label>
                <Choices>
                    <Choice>
                        <Value>source</Value>
                        <Display>Keep Source</Display>
                    </Choice>
                    <Choice>
                        <Value>target</Value>
                        <Display>Keep Target</Display>
                    </Choice>
                </Choices>
                <DefaultValue>target</DefaultValue>
            </Property>
        </Properties>
        <ApplicationEntity cdmID="dm://">
            <ApplicationEntity cdmID="dm://PRODUCT1">
                <ApplicationEntity cdmID="dm://PRODUCT1/prod1:20"
                securityID="SecId1">
                    <ApplicationEntity
                    cdmID="dm://PRODUCT1/prod1:20/UserApplication">
                        <Mappings>
                            <Mapping class="packlet"
                            propertyID="PRODUCT1.packletLocation">
                                <SourceValue>
                                    //FileServer/Packlets/prod1.pak
                                </SourceValue>
                                <TargetValue>
                                    //FileServer/Packlets/prod1.pak
                                </TargetValue>
                            </Mapping>
                        </Mappings>
                        <Fixups>
                            <Fixup cdmID="dm:://PRODUCT2/prod2:389/ns1/UC/UC1">
                                <SourceValue>UC1ID</SourceValue>
                            </Fixup>
                            <Fixup cdmID="dm:://PRODUCT2/prod2:389/ns1/UC/UC2">
                                <SourceValue>UC2ID</SourceValue>
                            </Fixup>
                            <Fixup cdmID="dm:://PRODUCT2/prod2:389/ns1/UC/UC3">
                                <SourceValue>UC3ID</SourceValue>
                            </Fixup>
                        </Fixups>
                        <ApplicationEntityRef cdmID="dm://PRODUCT3/prod3:2000/" />
                        <ApplicationEntityRef cdmID="dm://PRODUCT2/prod2:389/ns1" />
                    </ApplicationEntity>
                </ApplicationEntity>
            </ApplicationEntity>
            <ApplicationEntity cdmID="dm://PRODUCT3">
                <ApplicationEntity cdmID="dm://PRODUCT3/prod3:2000"
                securityID="SecId1">
                    <Mappings>
                        <Mapping class="packlet" mappingID="packlet1"
                        propertyID="PRODUCT3.packletLocation">
                            <SourceValue>//FileServer/Packlets/
                            prod3_1.pak</SourceValue>
                            <TargetValue>//FileServer/Packlets/
                            prod3_1.pak</TargetValue>
                        </Mapping>
                        <Mapping class="packlet" mappingID="packlet2"
                        propertyID="PRODUCT3.packletLocation">
                            <SourceValue>//FileServer/Packlets/
```

-continued

```xml
                            prod3_2.pak</SourceValue>
                            <TargetValue>//FileServer/Packlets/
                            prod3_2.pak</TargetValue>
                        </Mapping>
                    </Mappings>
                    <Fixups>
                        <Fixup cdmID="dm:://PRODUCT2/prod2:389/ns1/UC/UC3">
                            <SourceValue>UC3ID</SourceValue>
                        </Fixup>
                        <Fixup cdmID="dm:://PRODUCT2/prod2:389/ns1/UC/UC4">
                            <SourceValue>UC4ID</SourceValue>
                        </Fixup>
                        <Fixup cdmID="dm:://PRODUCT2/prod2:389/ns1/UC/UC7">
                            <SourceValue>UC7ID</SourceValue>
                        </Fixup>
                        <Fixup cdmID=
                        "dm:://PRODUCT2/prod2:389/ns1/Certificate/C1">
                            <SourceValue>C1Value</SourceValue>
                        </Fixup>
                    </Fixups>
                    <ApplicationEntityRef cdmID="dm://PRODUCT2/prod2:389/ns1" />
                </ApplicationEntity>
            </ApplicationEntity>
            <ApplicationEntity cdmID="dm://PRODUCT2">
                <ApplicationEntity cdmID="dm://PRODUCT2/prod2:389">
                    <ApplicationEntity       cdmID="dm://PRODUCT2/prod2:389/ns1"
                    securityID="SecId1">
                        <Policies>
                            <PropertyRef propertyID = "PRODUCT2.conflict">
                                <Value>merge</Value>
                            </PropertyRef>
                            <PropertyRef propertyID = "PRODUCT2.merge" />
                                <Value>source</Value>
                            </PropertyRef>
                        </Policies>
                        <Mapping class="packlet" propertyID=
                        "PRODUCT2.packletLocation">
                            <SourceValue>//FileServer/Packlets/ns1.lae</SourceValue>
                            <TargetValue>//FileServer/Packlets/ns1.lae</TargetValue>
                        </Mapping>
                    </ApplicationEntity>
                </ApplicationEntity>
            </ApplicationEntity>
        </Package>
    </InstallPackage></Command>
</Request>
Deployment Engine Request (to Content Providers)
<Request synchronous="true" version="1.0" locale="en-us">
    <SecurityDescriptor class="Security" securityID="SecId1">
        <SecurityNamespace>NamespaceName</SecurityNamespace>
        <SecurityTicket>3131643595U4lWAlDRMX</SecurityTicket>
    </SecurityDescriptor>
    <Command>
        <InstallPacklet execute="True">
            <Packlet>
                <PackletDefinition>
                    <!-- Removed for clarity. -->
                </PackletDefinition>
                <Properties>
                    <!-- Removed for clarity. -->
                </Properties>
                <ApplicationEntity cdmID="dm://PRODUCT2">
                    <ApplicationEntity cdmID="dm://PRODUCT2/prod2:389">
                        <ApplicationEntity       cdmID="dm://PRODUCT2/prod2:389/ns1"
                        securityID="SecId1">
                            <Policies>
                                <!-- Removed for clarity. -->
                            </Policies>
                            <Mapping class="packlet" propertyID=
                            "PRODUCT2.packletLocation">
                                <!-- Removed for clarity. -->
                            </Mapping>
                            <Fixups>
                                <Fixup cdmID="dm:://PRODUCT2/prod2:389/ns1/UC/UC1">
                                    <SourceValue>UC1ID</SourceValue>
                                    <TargetValue>newID</TargetValue>
                                </Fixup>
                                <Fixup cdmID="dm:://PRODUCT2/prod2:389/ns1/UC/UC2">
```

```
                            -continued

<SourceValue>UC2ID</SourceValue>
                        <TargetValue>newID</TargetValue>
                    </Fixup>
                    <Fixup cdmID="dm::://PRODUCT2/prod2:389/ns1/UC/UC3">
                        <SourceValue>UC3ID</SourceValue>
                        <TargetValue>newID</TargetValue>
                    </Fixup>
                    <Fixup cdmID="dm::://PRODUCT2/prod2:389/ns1/UC/UC4">
                        <SourceValue>UC4ID</SourceValue>
                        <TargetValue>newID</TargetValue>
                    </Fixup>
                    <Fixup cdmID="dm::://PRODUCT2/prod2:389/ns1/UC/UC7">
                        <SourceValue>UC7ID</SourceValue>
                        <TargetValue>newID</TargetValue>
                    </Fixup>
                    <Fixup cdmID="dm::://PRODUCT2/prod2:389/ns1/Cert/C1">
                        <SourceValue>C1Value</SourceValue>
                        <TargetValue>newValue</TargetValue>
                    </Fixup>
                </Fixups>
            </ApplicationEntity>
          </ApplicationEntity>
        </ApplicationEntity>
      </Packlet>
    </InstallPacklet>
  </Command>
</Request>
Content Provider Response (to Deployment Engine)
<Response>
    <Status successful="true"/>
    <Result>
        <AuditLog>
            <AuditEntry    type="information" timeStamp="2000-05-12 04:29:33.005"
            timeZone="GMT-05:00" sourceID="PRODUCT2"
            category="Merge Warnings">
                <AuditDescription>User 'fred' overwritten</AuditDescription>
                <AuditData>
                    <![CDATA[dm://PRODUCT2/prod2:389/ns1/User/UserID1]]>
                </AuditData>
            </AuditEntry>
        </AuditLog>
    </Result>
</Response>
Deployment Engine Response (to Client)
<Response>
    <Status successful="true"/>
    <Result>
        <AuditLog>
            <AuditEntry    type="information" timeStamp="2000-05-12 04:29:33.005"
            timeZone="GMT-05:00" sourceID="PRODUCT1"
            category="Merge Warnings">
                <AuditDescription>ApplicationElement 'fred'
                overwritten</AuditDescription>
                <AuditData>
                    <![CDATA[dm://PRODUCT1/prod1:20/UserApplication/NI/335ab8d99af]]>
                </AuditData>
            </AuditEntry>
            <AuditEntry    type="information" timeStamp="2000-05-12 04:29:33.007"
            timeZone="GMT-05:00" sourceID="PRODUCT1"
            category="Merge Warnings">
                <AuditDescription>ApplicationElement 'wilma'
                overwritten</AuditDescription>
                <AuditData>
                    <![CDATA[dm://PRODUCT1/prod1:20/UserApplication/NI/335ab8d99bf]]>
                </AuditData>
            </AuditEntry>
            <AuditEntry    type="information" timeStamp="2000-05-12 04:29:33.015"
            timeZone="GMT-05:00" sourceID="PRODUCT1"
            category="Merge Warnings">
                <AuditDescription>ApplicationElement 'barney'
                overwritten</AuditDescription>
                <AuditData>
                    <![CDATA[dm://PRODUCT1/prod1:20/UserApplication/NI/335ab8d99cf]]>
                </AuditData>
            </AuditEntry>
            <AuditEntry    type="information" timeStamp="2000-05-12 04:29:34.035"
            timeZone="GMT-05:00" sourceID="PRODUCT1"
            category="Merge Warnings">
                <AuditDescription>ApplicationElement 'betty'
```

-continued

```
            overwritten</AuditDescription>
            <AuditData>
                <! [CDATA [dm://PRODUCT1/prod1:20/UserApplication/NI/335ab8d99df] ] >
            </AuditData>
        </AuditEntry>
    </AuditLog>
  </Result>
</Response>
```

Numerous modifications, variations and adaptations may be made to the particular embodiments of the invention described above without departing from the scope of the invention, which is defined in the claims.

Appendix. Document Type Description (DTD)

A XML requests(commands) in alphabetical order.

1) CreatePackage

The CreatePackage command creates a new package.

2) CreatePacklet

The CreatePacklet command creates a new packlet.

3) GetApplicationComponents

The GetApplicationComponents command retrieves the application components exposed by the given content servers. Any ApplicationComponent elements contained in the ContentServer child element will be replaced in the results.

The ContentServer elements that are returned contain their ApplicationComponent hierarchy.

4) GetMappingChoices

The GetMappingChoices command retrieves the list of possible values for mappings given the current configuration of a package or packlet. The Package or Packlet child element provides the information on the mappings and their context so that each content provider can express the possible values.

If a Package is passed to the GetMappingChoices then a Package is returned.

If a Packlet is passed to the GetMappingChoices then a Packlet is returned.

5) GetPackageDefinition

The GetPackageDefinition retrieves the template of a package definition for a given application definition.

6) GetPackletDefinition

The GetPackletDefinition command has a dual purpose:

1. Retrieve the template of a packlet definition for the given application entities.
2. Retrieve the definition of the packlet that is required to be able to resolve the given fixups on the target environment.

7) GetSecurityDescriptor

The GetSecurityDescriptor command returns a security descriptor of the requested type (for example Security System ticket, Security System certificate, etc) using the provided information to generate the security descriptor.

8) InstallPackage

The InstallPackage command installs or validates the installation of a package.

An 'execute' attribute specifies if the installation of the package should be performed. If this value is false, there is only a validation of the installation process.

9) InstallPacklet

The InstallPacklet command installs or validates the installation of a packlet.

An 'execute' attribute specifies if the installation of the packlet should be performed. If this value is false, there is only a validation of the installation process.

10) Ping

The Ping command (or request) verifies if a content server is currently responding to requests.

11) ResolveFixup

The ResolveFixup command is used to resolve the fixups that are part of a packlet.

12) ShowInputBox

The ShowInputBox command is used to query the end-user for additional information that is required to complete a command successfully.

13) ShowMessageBox

The ShowMessageBox command is used to prompt the end-user with an message and title and a combination of push buttons.

14) ShowProgress

The ShowProgress command is report a command progress to the user interface.

B XML Entities in alphabetical order

1) ApplicationComponenet

The ApplicationComponent element identifies a deployable component that is part of an application. An ApplicationComponent may contain one or more ApplicationComponent that represents the hierarchy of this component.

A 'dmID' attribute contains the information required to locate that resource. A 'securityID' is a reference to a security descriptor used to secure this ApplicationComponent.

* USED BY: APPLICATIONCOMPONENT, APPLICATIONDEFINITION, CONTENTSERVER.

2) ApplicationDefinition

The ApplicationDefinion element describes an application by listing all its ApplicationComponent.

* Used by: GetPackageDefinition, PackageDefinition.

3) ApplicationEntity

The ApplicationEntity element is used to represent any Deployment Manager application entity.

The Policies child element contains the packing and install policies for this application entity.

The Mappings child element contains the mappings for this application entity. The Fixups child element contains the fixups for this application entity. An ApplicationEntity may contain one or more ApplicationEntity or ApplicationEntityRef that represents the hierarchy of this entity.

A 'dmID' attribute contains the information required to locate that resource. A 'securityID' is a reference to a security descriptor used to secure this ApplicationEntity. A 'mandatory' attribute indicates if this application entity must be present in an application. A 'selected' attribute indicates if this application entity is to be included in the application package.

* USED BY: GETPACKLETDEFINITION, APPLICATIONENTITY, PACKAGE, PACKAGEDEFINITION, PACKLET, PACKLETDEFINITION.

4) ApplicationEntityRef

The ApplicationEntityRef element is used to represent a reference to a application entity within the same document.

ApplicationEntityRefs should be organised hierarchically with the root node referencing the deployment provider.

A 'dmID' attribute contains the information required to locate that resource.

* USED BY: APPLICATIONENTITY, APPLICATIONENTITYREF.

5) AuditData

The AuditData element contains private audit information of an AuditEntry element.

* Used by: AuditEntry.

6) AuditDescription

The AuditDescription element contains textual information of an AuditEntry element.

* Used by: AuditEntry.

7) AuditEntry

The AuditEntry element represents one entry of the collection of audit information.

A 'type' attribute contains the audit entry type. A 'timeStamp' attribute contains the time when the audit entry occurred.

* USED BY: AUDITLOG.

8) AuditLog

The AuditLog element contains auditing information for a command.

* Used by: Response.

9) Caption

The Caption element is used to specify a caption text of a message box.

* Used by: ShowMessageBox.

10) Choice

The Choice element is used to specify a valid simple property value. It contains the actual value and, optionally, a localised display value.

* Used by: Choices.

11) Choices

The Choices element is a list of one or more Choice elements.

* Used by: Mapping, Property.

12) Command

The Command element describes a deployment command.

* Used by: Request.

13) ContentServer

The ContentServer element identifies a deployment server. A ContentServer may contain one or more ApplicationComponent that represents the hierarchy of the application components available from this deployment server.

A 'dmID' attribute contains the information required to locate that resource. A 'securityID' is a reference to a security descriptor used to secure this ContentServer.

* Used by: GetApplicationComponents, Ping, Result.

14) DefaultValue

The DefaultValue element is used to specify a default simple property value.

* Used by: Property.

15) Description

The Description element is used to provide a description of its enclosing element.

* Used by: Property.

16) DialogResult

The DialogResult element defines the possible result values for the ShowMessageBox and ShowInputBox commands.

A 'value' attribute contains the message box returned value.

* Used by: Result.

17) Display

The Display element is used to provide a localised string of a choice's value.

* Used by: Choice.

18) Error

The Error element is a stack of error messages. An Error may contain one Error allowing the representation of a stack of errors. The ErrorText child element contains the textual message for this error.

A 'module' attribute contains information on the module that generated the error. A 'code' attribute contains the error code as reported by the module.

* Used by: Error, Status.

19) ErrorText

The ErrorText element represents localised error messages.

* Used by: Error.

20) Fixup

The Fixup element represents a fixup that must occur on the target environment. A Fixup contains a SourceValue that identifies its value in the source environment. Once it has been resolved on the target environment, it contains a TargetValue that represents the new value in the target environment.

A 'dmID' attribute contains the information required to locate the deployment server that can resolve these fixups.

* Used by: FIXUPS.

21) Fixups

The Fixups element is a list of one or more Fixup elements.

* Used by: GetPackletDefinition, ApplicationEntity.

22) InitSettings

The InitSettings element provides initialisation settings for the DM_Initialize function. An 'interactive' attribute states if a session can interact with the user interface. A 'locale' attribute informs the session of the locale to use for this session.

* Used by: N/A.

23) Label

The Label element is used to provide a short description of its enclosing element. This label is used by the UI when displaying information about an element.

* Used by: Property.

24) Mapping

The Mapping element represents a mapping that must occur on the target environment. A Mapping contains a SourceValue that identifies its value in the source environment. Once it has been set, the TargetValue contains the new value in the target environment. Additionally, the Choices element can contains a collection of possible values.

A 'class' attribute contains the mapping class (e.g. packlet, target, database, eMail addresses, etc.)

A 'mappingID' attribute contains an identification value used and known by the providers. A 'propertyID' attribute refers to a Property definition.

* Used by: Mappings.

25) Mappings

The Mappings element defines a collection of mapping that can be resolved by the user on the target environment.

* Used by: ApplicationEntity.

26) Package

The Package element describes a package. The PackageDefinition child element contains the description of the package. The Properties child element contains all the Property definitions for the application entities that follow. The ApplicationEntity child element contains a hierarchy of application entities.

* Used by: GetMappingChoices, InstallPackage, Result.

27) PackageDefinition

The PackageDefinition element describes the entities that are part of a package. The ApplicationDefinition child element contains the definition of the application. The Properties child element contains all the Property definitions for the application entities that follow. The ApplicationEntity child element contains a hierarchy of application entities.

* Used by: CreatePackage, Package, Result.

28) Packlet

The Packlet element describes a packlet. The PackletDefinition child element contains the description of the packlet. The Properties child element contains all the Property definitions for the application entities that follow. The ApplicationEntity child element contains a hierarchy of application entities.

* Used by: GetMappingChoices, InstallPacklet, ResolveFixup, Result.

29) PackletDefinition

The PackletDefinition element describes the entities that are part of a packlet. The Properties child element contains all the Property definition for the application entities that follow. The ApplicationEntity child element contains a hierarchy of application entities.

* Used by: CreatePacklet, Packlet, Result.

30) Policies

The Policies element defines a collection of policies that dictates the behaviour of the packing or install of application entities. The Policies element may contain one or more PropertyRef element. The PropertyRef child element represents a reference to an existing property definition.

* Used by: ApplicationEntity.

31) Properties

The Properties element contains one or more Property element.

* Used by: Package, PackageDefinition, Packlet, PackletDefinition.

32) Property

The Property element is used to define the nature of a value. The Property element contains a mandatory Label element, and optional Description, Choices, and DefaultValue elements. The Description, Choices and DefaultValue child element may be used to provide guidance to the end user in deciding how to set the properties.

A 'propertyID' attribute specifies a unique identifier throughout the XML document. A 'style' attribute specifies the preferred way to display this property. A 'datatype' attribute specifies the data representation of this property value. A 'group' attribute specifies grouping information.

* Used by: ShowInputBox, Properties.

33) PropertyRef

The PropertyRef element is a reference to an existing Property element. A PropertyRef element may contain a Value.

A 'propertyID' attribute refers to a Property definition.

* Used by: Policies.

34) Request

The Request element is used to represent a deployment request. The SecurityDescriptor child element provides security information for the elements that refer to it. The Command child element contains a command to be executed.

A 'version' attribute defines the version of the structure language grammar. A 'synchronous' attribute means that this request should wait for completion before returning to the caller.

* Used by: N/A.

35) Response

The Response element is used to represent the answer to a request. The Status child element contains the status of the command along with possible error information. The optional Result child element contains data that is specific to each command. The optional AuditLog child element contains audit details.

* Used by: N/A.

36) Result

The Result element describes the result of a deployment command.

* Used by: Response.

37) SecurityDescriptor

The SecurityDescriptor element is used to provide login information for the different application entities.

A 'class' attribute defines the type of security information embedded in this element. A 'securityID' attribute uniquely identifier this security descriptor throughout the XML document.

* Used by: Request, Result.

38) SecuritySystemConfig

The SecuritySystemConfig element identifies the runtime configuration used to authenticate with Security System.

* Used by: GetsecurityDescriptor

39) SecuritySystemNamespace

The SecuritySystemNamespace element identifies the namespace used during authentication with Security System.

* Used by: SecuritySystemConfig, SecurityDescriptor.

40) SecuritySystemRuntimeConfig

The SecuritySystemRuntimeConfig element identifies the runtime configuration used during authentication with Security System. A SecuritySystemRuntimeConfig element contains the data returned by the Security System API call SS_GetRuntimeConfig( ).

* Used by: SecuritySystemConfig.

41) SecuritySystemTicket

The SecuritySystemTicket element contains the ticket information returned by Security System.

* Used by: SecurityDescriptor.

42) SessionSettings

The SessionSettings element provides initialisation settings for the DM_CreateSession function.

* Used by: N/A.

43) SourceValue

The SourceValue element is used to represent the value of a fixup or a mapping within the source environment. The content provider that resolves these defines the content of this element.

* Used by: Fixup, Mapping.

44) Status

The Status element is used to specify the successful completion of a request. The Status element contains an Error element representing the error stack when the successful attribute is false.

A 'successful' attribute expresses the status of a command.

* Used by: Response.

45) TargetValue

The TargetValue element is used to represent the value of a fixup or a mapping within the target environment. The content provider that resolves these defines the content of this element.

* Used by: Fixup, Mapping.

46) Text

The Text element is used to display text in ShowProgress and ShowMessageBox commands.

* USED BY: SHOWMESSAGEBOX, SHOWPROGRESS.

47) Value

The Value element is used to specify a simple value.

* USED BY: CHOICE, PROPERTYREF, RESULT.

What is claimed is:

1. A method for creating and deploying an application comprising the steps of:
   (a) identifying environmental dependencies for the application in a target environment, the target environment and a source enviroment being part of a distributed comprising environment, the application comprising information and data;
   (b) defining an application definition comprising a list of application components to be deployed in the target environment; the application components being available in the source environment, and including at least one application entity;
   (c) creating a package definition comprising the application definition, packlet definition asscociated with the application entity, and deployment policy to control deployment of the information and data into the target environment;
   (d) executing instruction to create an application package according to the package definition; and
   (e) deploying the application from the source environment to target environment by installing the application package in the target environment in accordance with the package definition; and
   (f) defining an environment for creating a configuration definition; wherein the configuration definition is a structured document.

2. A method according to claim 1, wherein the configuration definition includes a source definition and a target definition containing information on a network location of a source system and a target system respectively.

3. A method according to claim 2, wherein the configuration definition includes a plurality of source definitions containing information on network locations of plural source systems.

4. A method according to claim 2, wherein the configuration definition includes a plurality of source definitions containing information on network locations of plural source systems.

5. A method according to claim 1, wherein, in the environment defining step, an existing configuration definition is changed.

6. A method according to claim 1, wherein the application definition is a structured document.

7. A method according to claim 1, wherein the package definition is updated and used repeatedly.

8. A method according to claim 1, wherein the application package is updated from an existing application package.

9. A method according to claim 1, wherein the application package is generated by an unattended operation.

10. A method according to claim 9, wherein a file containing a plurality of files listed in the application package is generated and transferred to the target environment.

11. A method according to claim 9, wherein the application package is stored in a shared directory on a network.

12. A method according to claim 1, wherein the application package is installed into plural target environments.

13. A method for creating and deploying an application comprising the steps of:
   (a) determining application components which are available from a source enviroment, the application components comprising application entities;
   (b) identifying environmental dependencies for the application in a target environment, the target environment and the source environment being part of a distributed computing environment, the application comprising information and data;
   (c) defining an application definition comprising a list of application components to be deployed in the target environment, the application components being available in the source environment, and including at least one application entity;
   (d) creating a package definition comprising the application definition, packlet definition associated with the application entity, and deployment policy to control deployment of the information and data into the target environment;
   (e) executing instructions to create an application package according to the package definition, wherein the application package is a structured document;
   (f) deploying the application from the source environment to target environment by installing the application package in the target environment in accordance with the package definition.

14. A method according to claim 13, wherein each application entity has a unique identifier.

15. A method according to claim 13, wherein the application definition includes a list of word processor documents, files, folders, and HTML pages.

16. A method according to claim 13, wherein the deployment policy is selected from a group consisting of a global policy, a packing policy, behavioral policy, a mapping policy and combination thereof.

17. A method according to claim 13, further comprising the step of:
   singling out a fix-up which is to be resolved in the target environment.

18. A method according to claim 17, wherein a graph is generated during the creating package definition step.

19. A method according to claim 13, further comprising the step of:
   specifying information required for installation.

20. A method according to claim 19, wherein the information specifying step comprises step of:
   (i) selecting the application components to be installed in the environment;
   (ii) mapping references within the application to entities in the target environment required by the application created by the application package creating step (d); and
   (iii) defining policies to resolve content conflicts arising during the deploying step.

21. A method according to claim 20, wherein the application components selecting step (i) includes the sep of selecting application entries from a list of application entities which is available from the application package.

22. A method according to claim 20, wherein the entities generated in the mapping step (ii) includes mapping selected from the group consisting of packlet mappings, target mappings, and custom mappings.

23. A method according to claim 20, wherein, in the step (iii) of defining policies, the policies include conflict resolution policies and fix-up policies.

24. A method according to claim 23, wherein the conflict resolution policy for each application entity is shared with one or more application entities.

25. A method for use in a distributed computing environment for creating and deploying an application, the method comprising steps of:

(a) determining application components which are available from a source environment, the application components comprising application entities;
(b) identifying environmental dependencies for the application in a target environment, the target environment and the source environment being part of a distributed computing environment, the application comprising information and data;
(c) defining an application definition comprising a list of application components to be deployed in the target environment, the application components being available in the source environment, and including at least one application entity;
(d) creating a package definition comprising the application definition, packlet definition associated with the application entity, and deployment policy to control deployment of the information and data into the target environment;
(e) executing instructions to create an application package according to the package definition, wherein the aplication packge is a structured document;
(f) specifying information to be required for installing by:
　(i) selecting the application components to be installed in the target environment;
　(ii) mapping reference within the application to entities in the target environment required by the application created by the application package creating step (e, and
　(iii) defining policies to resolve content conflicts which arise during an application package placing step;
(g) deploying the application from the source environment to target environment by installing the application package in the target environment in accordance with the package definition; and
(h) validating the installation by identifying a conflict situation for which no policies have been defined the defining policy step (f) (iii) and defining a policy for the conflict situation.

26. A method according to claim 25, wherein the validating Step (h) is iterated.

27. A system for use in a distributed computing environment, for crating and deploying an application into a target environment, the system comprising:
(a) means for identifying environmental dependencies for the application in a target environment, the target environment and a source environment being part of a distributed computing environment, the application comprising information and data;
(b) means for defining an application definition comprising a list of application components to be deployed in the target environment, the application components being available in the source environment, and including at least one application entity;
(c) means for creating a package definition comprising the application definition, packlet definition associated with the application entity, and deployment policy to control deployment of the information and data into the target environment;
(d) means for executing instructions to create an application package according to the package definition, wherein the application package is a structured document; and
(e) means for deploying the application from the source environment to target environment by installing the application package in the target environment in accordance with the package definition.

28. A system for use in a distributed computing environment for creating and deploying an application into a target environment, the system comprising:
(a) means for determining application components which are available from a source environment, wherein the application components comprising application entities;
(b) means for identifying environmental dependencies for the application in a target environment, the target environment and the source environment being part of a distributed computing environment, the application comprising information and data;
(c) means for defining an application definition comprising a list of application components to be deployed in the target environment, the application components being available in the source environment, and including at least one application entity;
(d) means for creating a package definition comprising the application definition, packlet definitoin associated with the application entity, and deployment policy to control deployment of the information and data into the target environment;
(e) means for executing instructions to create an application package according to the package definition, wherein the application package is a structured document; and
(f) means for deploying the application from the source environment to target environment by installing the application package in the target environment in accordance with the package definition.

29. A system for use in a distributed computing environment for creating and deploying an application into a target environment, the system comprising:
(a) means for determining application components which are available from a source environment, wherein the application components comprise one or more components modelled, organized, and presented so as to solve a business need;
(b) means for creating an application definition;
(c) means for defining a package according to the application definition—for creating a package definition;
(d) means for creating a packlet associated with each application entity in accordance with the package definition;
(e) means for singling out a fix-up which is to be resolved on the target environment;
(f) means for creating an application package containing all the information required to install an application, at least part of the information being in the form of application entities, wherein the application package is a structured document;
(g) means for specifying information to be required for installing using:
　(i) means for selecting the application components to be installed in the target environment;
　(ii) means for mapping reference within the application to entities in the target environment required by the application created by the application package creating means (f); and
　(iii) means for defining policies to resolve content conflicts which are identified by an application package placing means;

(h) means for placing the application package content into the target environment; and
(i) means for validating the installation by identifying a conflict situation for which no policies have been defined by the means for defining policies (g)(iii), and defining a policy for the conflict situation.

* * * * *

UNITED STATES PATENT AND TRADEMARK OFFICE
CERTIFICATE OF CORRECTION

PATENT NO.        : 6,986,135 B2
APPLICATION NO.   : 09/948172
DATED             : January 10, 2006
INVENTOR(S)       : Burton Leathers and Christian Legault It is certified that error appears in the above-identified patent and that said Letters Patent is hereby corrected as shown below:

On Column 40, line 41, "definion" should read -- definition --

On column 45, line 12 (claim 1), "comprising" should read -- computing --

On column 45, line 24 (claim 1), "instruction" should read -- instructions --

On column 45, line 25 (claim 1), the word "and" should be removed

On column 45, line 39 (claim 3), "source" should read -- target --

On column 46, line 30 (claim 16), the word -- a -- should be inserted after the ",", and before the word "behavioral".

On column 46, line 42 (claim 20), "step" should read --steps --

On column 46, line 44 (claim 20), the word -- target -- should be inserted after the word "the" and before the word "environment".

On column 46, line 52 (claim 21), "sep" should read -- step --

On column 47, line 24 (claim 25), "reference" should read -- references --

On column 47, line 27 (claim 25), "(e" should read -- (e) --

On column 47, line 27 (claim 25), the "," should be replaced with -- ; --

On column 47, line 40 (claim 26), "Step" should read -- step --

On column 47, line 42 (claim 27), the "." after the word "environment" should be removed.

On column 48, line 21 (claim 28), "definitoin" should read -- definition--

UNITED STATES PATENT AND TRADEMARK OFFICE
CERTIFICATE OF CORRECTION

PATENT NO. : 6,986,135 B2
APPLICATION NO. : 09/948172
DATED : January 10, 2006
INVENTOR(S) : Burton Leathers and Christian Legault It is certified that error appears in the above-identified patent and that said Letters Patent is hereby corrected as shown below:

On column 48, line 61 (claim 29), "reference" should read --references --

Signed and Sealed this

Sixteenth Day of January, 2007

JON W. DUDAS
*Director of the United States Patent and Trademark Office*